J. M. WAUGH.
CAR CONSTRUCTION.
APPLICATION FILED AUG. 10, 1914.
1,262,572.
Patented Apr. 9, 1918.
5 SHEETS—SHEET 1.
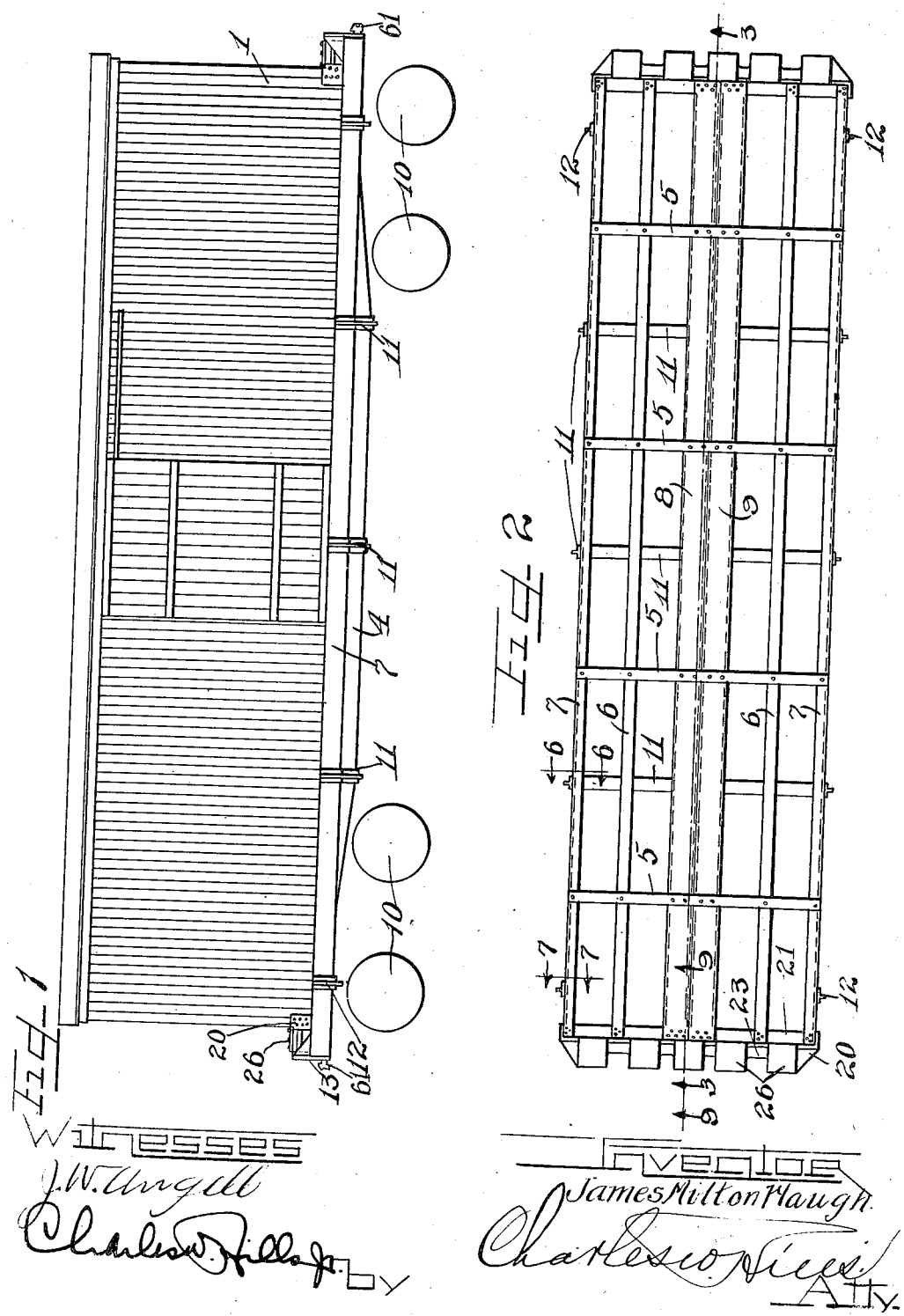

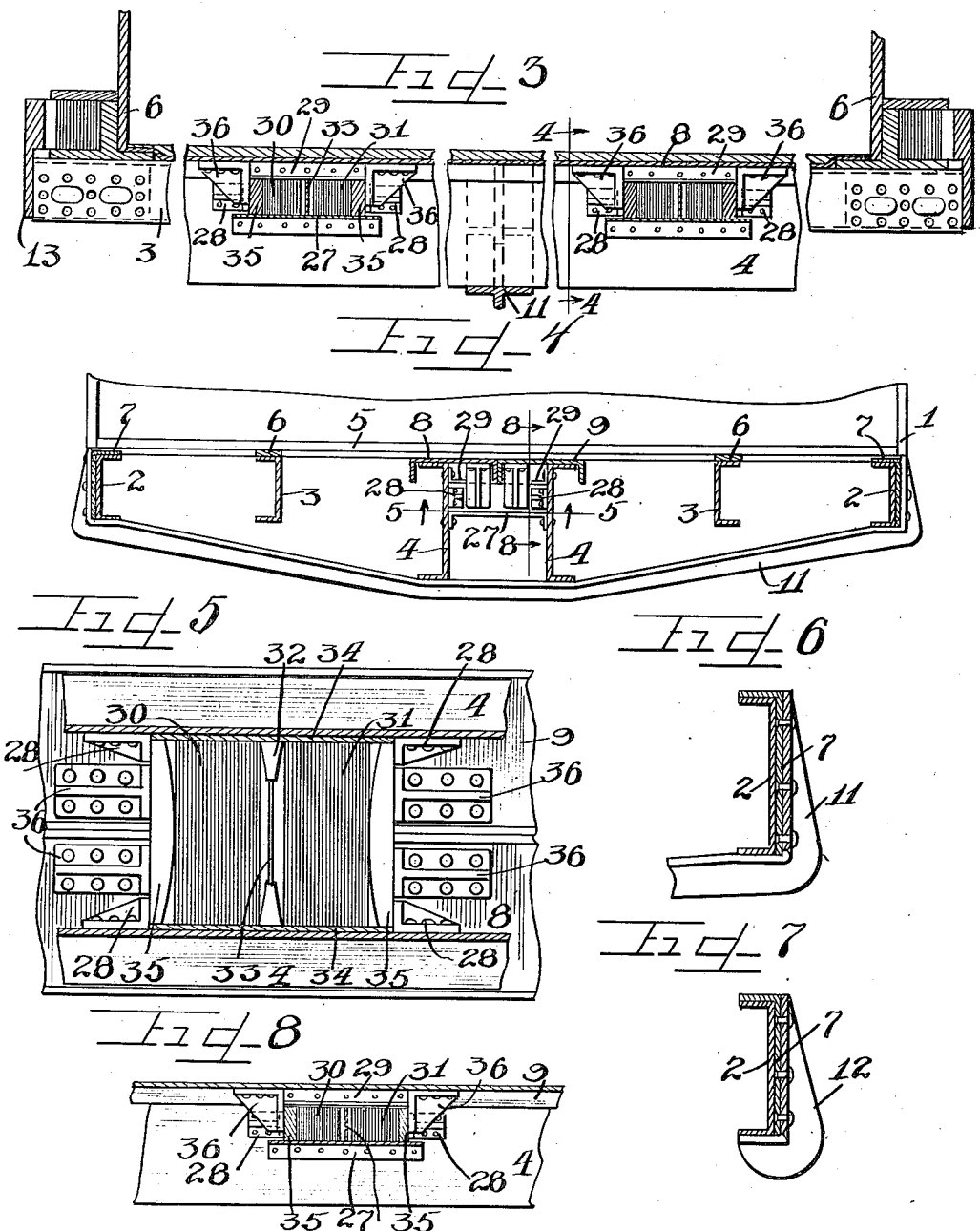

J. M. WAUGH.
CAR CONSTRUCTION.
APPLICATION FILED AUG. 10, 1914.
1,262,572.
Patented Apr. 9, 1918.
5 SHEETS—SHEET 3.
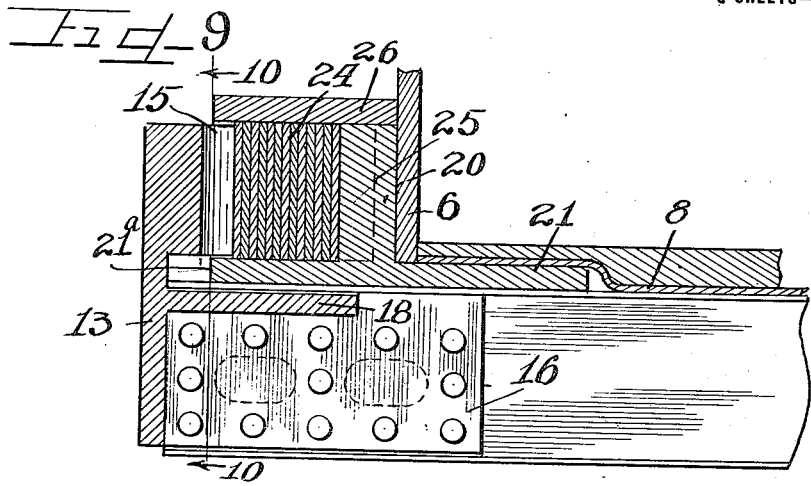
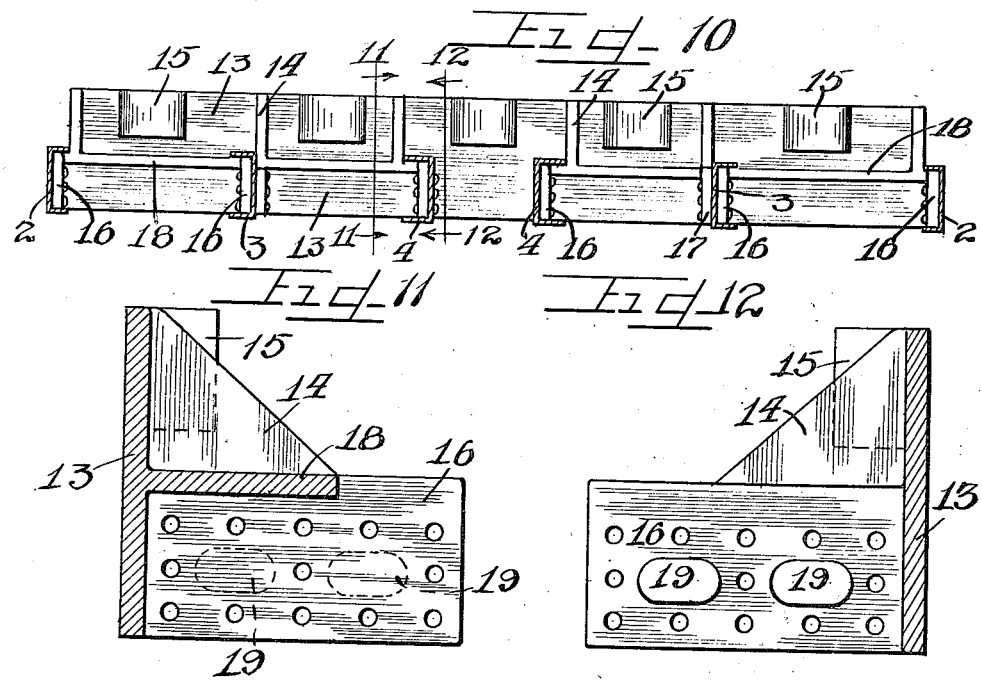

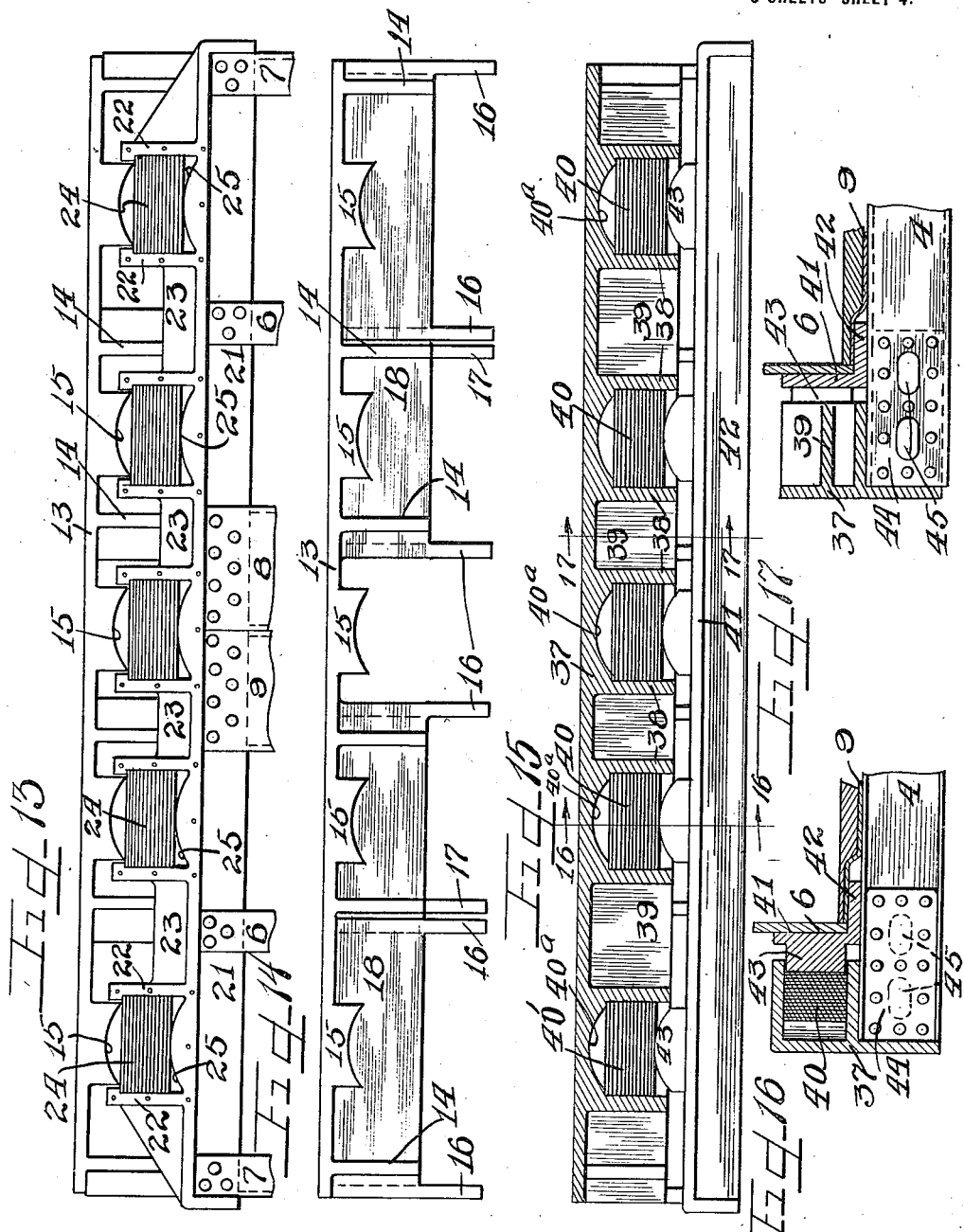

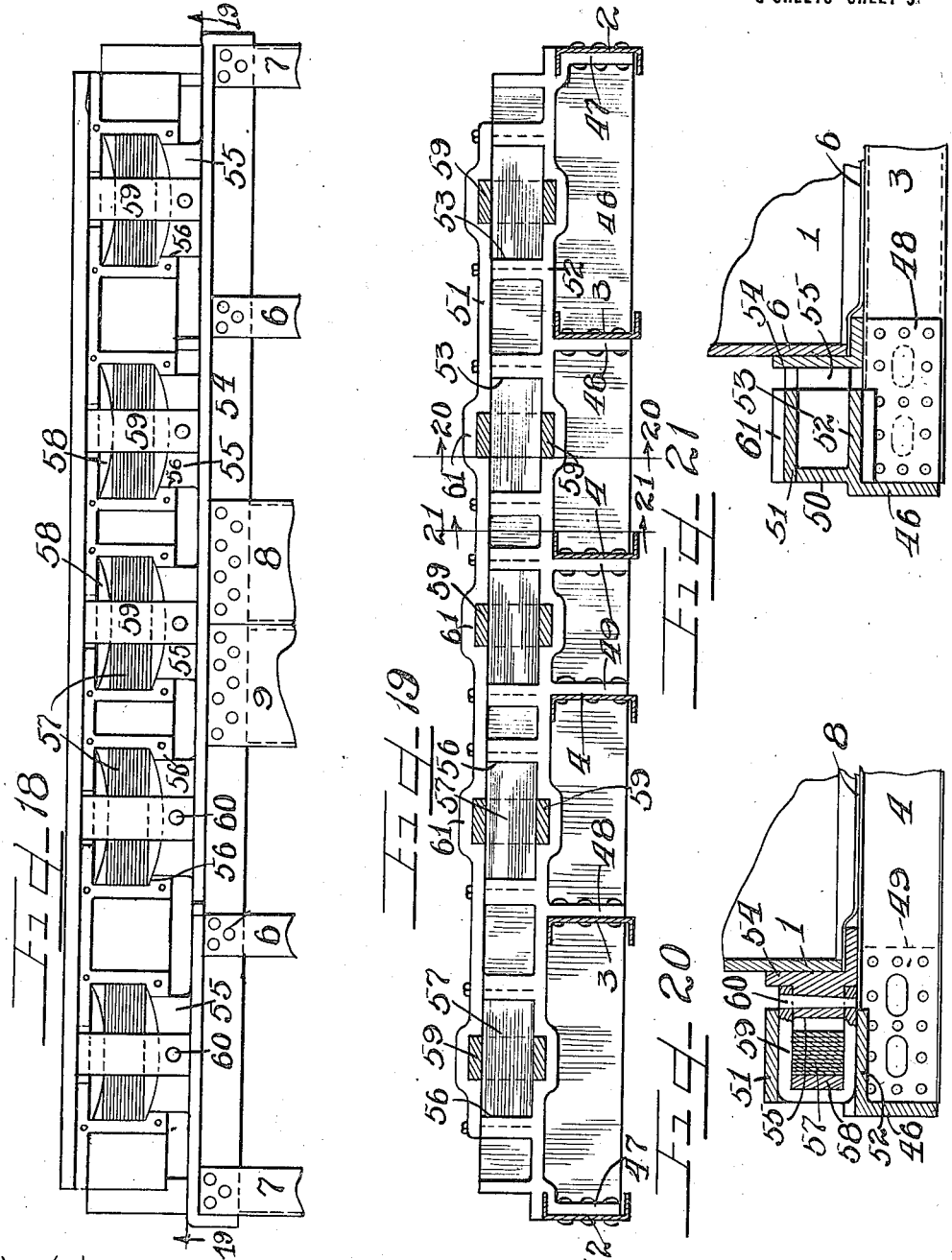

UNITED STATES PATENT OFFICE.

JAMES MILTON WAUGH, OF CHICAGO, ILLINOIS.

CAR CONSTRUCTION.

1,262,572.                  Specification of Letters Patent.      Patented Apr. 9, 1918.

Application filed August 10, 1914. Serial No. 856,006.

*To all whom it may concern:*

Be it known that I, JAMES MILTON WAUGH, a citizen of the United States, and a resident of the city of Chicago, in the county of Cook and State of Illinois, have invented certain new and useful Improvements in Car Constructions; and I do hereby declare that the following is a full, clear, and exact description of the same, reference being had to the accompanying drawings, and to the numerals of reference marked thereon, which form a part of this specification.

This invention relates to that type of car construction wherein the car body is movably mounted upon the car underframe, with mechanisms connected therebetween to absorb the impact stresses due to buffing of the car, or sudden changes in the speed thereof.

The destruction of car ends is largely due to the inertia of the car body, or if loaded, to the inertia of the contents of a car. In the latter instance the contents, in shifting, strikes the car end with heavy (and often destructive) impact. This invention reduces the danger of damage to the car end from these causes, to a minimum, so that longer life and greater service of the car is insured.

It is an object of this invention to construct a car wherein a car body is yieldably mounted upon the car underframing, and with a plurality of shock absorbing devices disposed both at the ends and intermediate the ends between said car body and the underframe to absorb stresses transmitted from one to the other.

It is also an object of this invention to construct a car wherein a plurality of shock absorption devices are rigidly secured on the underframe and on the car body affording a part of the connection therebetween, and act to absorb stresses transmitted from the underframe to the car body, and as well guide and control said car body in its movement and centralize the body on the underframe after each impact.

It is also an object of this invention to construct a car wherein a unitary member is secured upon each end of the underframe, affording a buffer block and end sill for the car, and constructed to coact with complemental devices secured upon the ends of the car body, and together forming a shock absorbing gear so that impact stresses between the underframe and the car body are absorbed by coaction of said gears at each end of the car and obviating dangerous effects upon any part the car.

It is also an object of this invention to provide a car construction wherein suitable absorption gears are associated with the center sills of the car frame, and as well at the ends thereof, adapted to coact with means secured upon the car body which is movable upon the car underframe to resist movement of the car body, and absorb abnormal impact stresses exerted between the car body and the car frame.

It is also an object of this invention to construct an underframe and a car body movable thereon and provided with absorption devices coacting upon said underframe and body and acting at both ends of the car body simultaneously to yieldingly restrain such movement and to return the body to normal central position after movement.

It is furthermore an important object of this invention to construct load absorption devices for use on cars wherein the car body is floatingly mounted upon and secured to the under frame, said absorption devices so constructed and connected in place that they act simultaneously but each independently, to absorb shocks transmitted from the underframe to the body and also the recoil, said shock absorbing devices at opposite ends of the car acting the one compressively and the other in tension and both acting reversely to return the body to normal central position after each shock.

It is finally an object of this invention to provide an improved car construction equipped with shock absorption devices whereby the car body is attached to the underframe at each of its ends to slide thereon, said devices acting simultaneously, the one under compression, the other under tension, to yieldingly restrain the body from movement on the underframe and to return the same to normal after each shock.

The invention (in a preferred form) is illustrated in the drawings, and hereinafter more fully described.

In the drawings:

Figure 1 is a conventional side elevation of a car equipped with devices embodying the principles of my invention.

Fig. 2 is a top plan view of the car bottom frame showing the same detached from the body.

Fig. 3 is an enlarged section taken on line 3—3 of Fig. 2.

Fig. 4 is an enlarged fragmentary section taken on line 4—4 of Fig. 3.

Fig. 5 is an enlarged sectional detail taken on line 5—5 of Fig. 4.

Fig. 6 is an enlarged detail section taken on line 6—6 of Fig. 2.

Fig. 7 is an enlarged, fragmentary detail section taken on line 7—7 of Fig. 2.

Fig. 8 is a detail section taken on line 8—8 of Fig. 4.

Fig. 9 is an enlarged, fragmentary detail section taken on line 9—9 of Fig. 2.

Fig. 10 is a reduced section taken on line 10—10 of Fig. 9.

Fig. 11 is an enlarged section taken on line 11—11 of Fig. 10.

Fig. 12 is an enlarged section taken on line 12—12 of Fig. 10.

Fig 13 is a top plan view of the coacting means comprising the end sill and absorption devices at one end of the car with the cover plates thereof removed.

Fig. 14 is a similar view of that portion of the mechanism secured upon the car underframing and affording an end sill and a part of the shock absorbing mechanism.

Fig. 15 is a horizontal transverse section taken through the coacting shock absorbing mechanisms of a modified form secured to the underframe and to the end of the car body.

Fig. 16 is a section on line 16—16 of Fig. 15.

Fig. 17 is a section on line 17—17 of Fig. 15.

Fig. 18 is a view similar to Fig. 15 of a modified form of device.

Fig. 19 is a section taken on line 19—19 of Fig. 18, and with parts omitted.

Fig. 20 is a section taken on line 20—20 of Fig. 19.

Fig. 21 is a section taken on line 21—21 of Fig. 19.

As shown in the drawings:

The car body, which in Fig. 1, is shown as that of a freight box car, is indicated as a whole by the reference numeral 1, and is yieldably mounted to slide upon a car underframe embracing side sills 2, intermediate sills 3, and center sills 4. All of said sills are channel members with the center sills 4, considerably wider than the intermediate and side sills, and tapering upwardly along their lower edge at each end of the car to a depth substantially equal to that of the intermediate and side sills. Said side sills are arranged with the flanges directed inwardly and the center sills are arranged back to back and a suitable distance apart as usual to receive the usual draft and buffing gears therebetween at the ends. The car body is constructed upon and rigidly secured to a car bottom frame comprising a plurality of transverse flat bars 5, which are secured to the under side of the car body 1, and bolted or riveted thereto and to the car body are longitudinal flat bars 6, affording intermediate car bottom frame sills, which normally rest slidably upon the intermediate sills 3, of the underframe. Angle bars 7, are also secured by their inner flanges to the ends of said transverse bars 5, and to the car bottom and afford car bottom frame side sills, said flanges slidably resting on the tops of the side sills 2 and the webs thereof fitting over the outer sides of said side sill members of the car underframe and extending to the bottom thereof.

Also secured to said transverse bars 5, and to the car body, are a pair of longitudinally extending downwardly directed channel members 8 and 9, forming the car bottom center sills which slidably rest on the center sills 4, of the underframe and are arranged with their inner flanges abutting one another. The width of web is such that the outer flanges engage around the upper flanges of the underframe center sill.

As already pointed out and clearly shown in Fig. 1, said center sill channels 4, decrease in depth at the ends of the car in order to permit the proper mounting of trucks therebeneath for wheels 10. Rigidly secured to the car bottom frame by bolts or rivets extending through the webs of the bottom frame side sills 7, are transverse ribbed beams 11, which fit closely around the outer side and bottoms of the bottom side sills 7, and extend close beneath the side sill 2, and downwardly to the center sills 4, of the underframe and act to hold the car body from detachment from lateral displacement on the underframe but permit of relative longitudinal movement thereon. At the point at which said center sills taper upwardly at the ends of the car, hooked members 12, are secured on the outer side of the bottom side sills 7 and engage beneath the lower flange of the side sills 2.

Rigidly secured to, and across the ends of the respective sills 2, 3, and 4, of the underframe, at each end thereof, is an end sill 13, preferably constructed of cast steel and provided with a plurality of triangular vertical webs 14, directed inwardly and longitudinally of the frame between which are abutment heads 15, which in the drawings, are shown with the inner face of each concave transversely the car.

Vertical webs 16, are also cast integrally on said end sills 13, so disposed thereon as to interfit within the flanges of the respective sill channels 2, 3, and 4, of the underframe, as clearly shown in Fig. 10. In the case of the intermediate sills 3, another web 17, in the plane of the triangular web 14, is formed parallel to said web 16, to engage along the outer surface of said intermediate sills 3, to receive attaching bolts or rivets therethrough to secure greater rigidity.

Formed integral with said webs 14, 16 and 17, and with the front wall of said abutment member 13, is a horizontal web or floor 18, which is cut away or omitted between the center sills 4, of the underframe. Formed on one surface of each of said webs 16, are raised rounded members or projections 19, adapted to engage in complemental recesses or apertures in the under sills to assist the bolts or rivets in holding the end member 13, in rigid engagement.

A heavy end shoe member 20, is secured to the car body and the sills of the car bottom frame, and forms an end sill for the car bottom frame. Said shoe is also preferably constructed integrally of cast steel. Said shoe is recessed to afford a flat, rearwardly directed, horizontal continuous web portion 21, on which the end of the car body 6, rests and is rigidly secured, and the flat vertical wall of said shoe abuts against and is secured to the end wall of the car body for the entire width of the car. As shown also, side flanges integral with the shoe, extend onto the side walls of the car and are secured thereto.

Said shoe 20, is provided with a horizontal bottom flange 21ª, which slides over the bottom flange 18, of the end sill and vertical webs or partition members 22, integral therewith, and with the vertical wall of the shoe, divides the same in a plurality of compartments in which are arranged shock absorbing members hereafter described. Integral horizontal webs 23, extend between the partition webs of adjacent compartments to reinforce the same. The distance between each pair of the partitions 22, of each compartment, is sufficient to permit the curved abutment heads 15, of the end sill 13, to enter therebetween. Accordingly a group or a plurality of groups of resilient friction plates 24, are disposed within each of the compartments and at the rear or inner side thereof bear against a convex abutting head 25, integral with the vertical wall of said shoe, as shown in Figs. 9 to 21 inclusive.

Of course, the abutment heads 15, on the end sills and 25, on the shoe, are complementally curved; either may be concave and the other convex. Said groups of spring friction plates thus bear at their ends on one abutment head and are engaged centrally on the opposite side by the other abutment head so that movement of the car body relative the underframe, acts to flex the plates of the groups as a whole. The partition walls 22, are aperturated to receive bolts for the attachment of cover plates 26, which serve to inclose and conceal said groups of friction plates within the compartments and to exclude dirt and water.

Other absorption gears are mounted intermediate the ends of the car, as shown clearly in Fig. 3, and for this purpose horizontal supporting plates 27, flanged at their margins, are attached to the inner faces of the center sills 4. Fixed shoulders or stops 28, are also secured on said respective center sills 4, and disposed above said plates 27, and beneath longitudinal extending guide angles 29, which are secured to said center sills 4, with the flanges thereof parallel to said plate 27. Resting upon each of said supporting plates 27, beneath said guides 29, are groups of resilient friction plates 30 and 31, with spacing members 32, which, as but two groups are shown, are substantially triangular in cross section, extending vertically between the groups at the ends and connected with one another by an intermediate tie member 33, which acts to hold said blocks spaced from one another in proper position for the ends of the groups to bear oppositely thereon. Of course, if more than two groups are used, the alternate spacing members are double convex, so that the groups bear against each other alternately at their ends and at their middles.

Wear plates 34, are positioned vertically between the fixed stops 28, lying against the inner surfaces of the center sill channels 4. Slidably mounted upon each of the supporting plates 27, between said wear plates 34, are follower blocks 35, one at each end of the gear, and normally resting at their outer sides at their ends against the fixed stops 28. Said follower blocks are either concave or convex at their inner faces, dependent on whether the next adjacent spacing member is concave or convex, inasmuch as the one should always be complemental with the other.

Rigidly secured upon the bottom center sills 8 and 9, of the car body, are strong depending brackets, 36, one pair disposed at each end of the gear formed by said groups of friction plates, and with the distance between said respective pairs of brackets equal to that between the fixed shoulders or stops 28, on the car frame, so that said brackets 36, normally bear on the outer flat surfaces of the follower blocks 35, at each end of the gear.

In the modified form of my invention illustrated in Figs. 15, 16 and 17, instead of the end member 13, already described, I employ a single integral end sill or abutment member 37, provided with a plurality of vertical partitions 38, and a horizontal web portion 39, and with groups of resilient friction plates 40, mounted in the compartments formed by said partitions 38. The end walls of said member 37, within the compartments formed by said partitions 38, are concave, as indicated by the reference numeral 40ª, to permit bending of said groups of plates 40. A long integral end shoe member 41, provided with a horizontal wall or web 42, which engages beneath the end of the car body and is rigidly attached thereto, slides upon the sill members of the car and is provided with abutment heads 43, which fit within the compartments formed in the member 37, bearing against the respective groups of friction plates 40. As before described, said end member 37, is provided with a plurality of vertical webs or walls 44, integral therewith, and positioned to engage within the respective sill members of the car frame, and raised rounded portions 45, thereon engage in complemental recesses in said sill members to assist the bolts or rivets in maintaining said end member associated with the car frame.

In the embodiment of my invention illustrated in Figs. 18 to 21 inclusive, I have shown an integral end sill member having a vertical transversely extending front wall 46, and a plurality of longitudinally extending short vertical webs 47, 48, and 49, integral therewith. Said webs are so spaced that the webs 47, engage within the side sill channels 2, the webs 48, lie flat against the back of the intermediate channels 3, and the webs 49, project between and lie flat against the back of the center sills 4, and, of course, each of said webs are riveted to the respective sills, so that a very strong and rigid end construction for the car frame is thereby assured. Said end member is also provided with a transversely extending vertical front wall 50, which is offset rearwardly a slight amount from the wall 46, and extending rearwardly therefrom is a horizontal bottom wall or floor 52, which, at a number of points intermediate the ends thereof, has formed integral therewith vertical partitions 53, which serve to afford a number of compartments within said integral end member. A cover plate 51, for said compartments is secured to the vertical wall 50, and partitions 53, and extends thereover for almost the entire length of the end member.

Secured beneath each end of the car body is a shoe, 54, which is slidably mounted upon the respective sills of the underframe, said shoe extending transversely across each end of the car body and riveted to the respective car bottom frame sills 6, 7, 8 and 9 thereof. A plurality of abutment heads 55, are formed integral with said end member 54, said abutment heads having a concave abutting surface which fits into the compartments between the partition walls 53, referred to in the description of the car frame end sill member.

As clearly shown, a plurality of shoulders 56, are formed on said partition walls 53, at the inner ends thereof, between which said abutment heads 55, engage, and placed within each of said compartments are groups of resilient friction plates 57, the ends of the innermost plate of each group bearing against said shoulders to prevent retractive movement of the plates from the compartment. A slidable convex follower block 58, is mounted within each of said plate compartments and normally rests against the inner surface of the wall 50, so that as the abutments 55, move inwardly in said compartments the movement of the plates being resisted by said curved follower block, the plates are stressed, the bending, of course, being resisted by the friction between the plates and also by the inherent resiliency thereof.

For the purpose of utilizing the frictional and resilient resistive effect of said plates when said abutment heads 55, are moved outwardly, straps or yokes 59, are secured by means of pins or bolts 60, to said abutment heads, and are engaged around the follower blocks 58, and friction plates 57 in each of the compartments. The front wall 50, of each of the compartments is cut away, and, as clearly shown also in Fig. 19, the cover plate 51, and bottom wall 52, are deformed, as indicated by the reference numeral 61, to receive the yokes slidably therein.

The operation is as follows:

The car body is movable as a whole upon the underframe, and consequently when sudden shocks or impacts are transmitted from the underframe, as in buffing or shifting a car from place to place, or due to the result of sudden changes in speed thereof, said car body moves upon the under frame, but the movement is easy and gradual, inasmuch as it is yieldably resisted by the numerous absorption gears forming the connection between the car body and the underframe, at each end of the car. Each set of such shock absorbing gears comprises a plurality of gears. Five individual gears are shown at each end the car in each set. All of said five gears operate simultaneously, so that substantially one unitary gear for the absorption of stresses is thus afforded. However, due to the disposition and arrangement of the gears the stress is evenly distributed and dissipated over the entire ends of both the underframe and the car body and bottom frame, and the same are thus better able to withstand the same.

Other gears for assisting in absorbing the stress transmitted between the car body and the car frame, are disposed intermediate the ends of the car mounted upon the center sills thereof, and in the latter instance said gears are adapted to resist movement of the car body upon the car frame in either direction. This is due to the fact that the resilient friction plates are held from movement except in the direction of the force impressed by the fixed shoulders or stops 28, which act to hold one of the proper follower blocks 35, from outward movement, and inasmuch as the car body moves upon the under frame, the abutment members 36, at the opposite ends of the particular gear in question bear inwardly toward the other follower block, forcing said resilient friction plates toward the opposite end of the gear compartment.

Due to the fact that either of the follower blocks 35, are movable inwardly within the plate compartments, thus stressing the plates by bending the same, it is obvious that movement of the car body is resisted in either direction owing to the fact that the abutment members attached to the car body contact said follower blocks at each end of the absorption gear. The heavy transverse beams 11, which are rigidly secured to the car body and engage beneath the center sills 4, of the car frame, act to maintain the body slidably upon the car frame, and the angle bar bottom side sills 7, at the sides of the body engaging over the side sills 2, of the car frame, assist in guiding the car body properly in its movement upon the under frame and prevent lateral displacement.

At or near the ends of the car the hook members 12, project beneath the side sills 2, and are rigidly secured to the bottom side sills 7, and act to assist in guiding the car body in its movement upon the car frame similarly to the action of the members 11, already described.

The operation of the groups of spring friction plates in absorbing stresses is well known, as I have used the same in draft and buffing gears for a number of years. The plates, due to their resiliency and frictional resistance, resist bending thereof, as they are forced inwardly in their respective casings by the follower blocks, but the dangerous recoil which would be present in the case of ordinary springs if such were used, is obviated, because of the enormous friction engendered between the plates, which acts to absorb the force of recoil, allowing the plates to resume their normal position gradually.

In the modification of my invention illustrated in Figs. 15, 16 and 17, I have merely reversed the parts at the ends of the car structure, so that the member rigid upon the car frame carries the resilient friction plates, and the abutment heads which coact therewith and interfit within the compartments carrying said plates are rigidly secured upon the car body. The method of attaching the end members of the car frame in either case to the sills thereof, affords a very rigid construction, reinforcing the under frame, and car bottom frame, so that said member acts not only as a sill member, but also as an abutment member for the car as a whole, and as well admits the adaptation thereto of the buffing rigging to resist movement of the car body on the car frame.

In the form of my device illustrated in Figs. 18 to 21 inclusive, I have shown an absorption gear connected at each end of the car to act together, the one in compression, the other in tension (dependent on the direction of the force impressed) to yieldingly resist relative movement between the underframe and car body, due to the inertia of the body or its contents. In this construction all the absorption gears act simultaneously at both ends of the car, the one acting as a draft gear and the other as a buffing gear to absorb the stress. This is due to the fact that the yokes 59, secured to the abutment heads 55, of the shoe 54, on which the car end is supported and attached, tend to draw the follower plates 58, outwardly with the car body as the same moves away from the end sill member. However, the resilient friction plates are held from movement by the shoulders 56, formed on the interior of the compartments, thus constraining said plates to bend, and the enormous friction of one upon the other serves to absorb the stress transmitted thereto. Preferably, the gears are installed under a sufficient initial stress to take up any possible slack.

Of course, when the aforesaid end of the car body moves in the opposite direction, the concave abutment heads 55, bear inwardly upon the respective groups of plates 57, and, inasmuch as the follower blocks 58, are held from movement by the front wall 50, of the end sill member, the end plates bend, thus absorbing the stress. Obviously, the yokes 59, have no function under such a condition of operation and merely move outwardly through the cut away portions of said front wall 50.

Of course, under all the varying conditions of service the usual buffing and draft gear, shown in Fig. 1 and indicated by the reference numeral 61, act as usual and coact thereby with the end and intermediate absorbing gears so that in use all the shock absorbing devices of the structure act together to diffuse, absorb and dissipate otherwise destructive shocks. Furthermore, the particular spring group arrangement may vary along well known lines, dependent on the number of groups in any individual gear.

I am aware that other absorbing devices than the groups of friction springs may be used and that various details of construction may be varied through a wide range without departing from the principles of this invention, and I therefore do not purpose limiting the patent granted otherwise than necessitated by the prior art.

I claim as my invention:

1. In a car of the class described the combination with the underframe thereof, of a car body frame movably mounted thereon, and shock absorption mechanisms connected at the ends of the car, each acting simultaneously, one by a buffing stress action and the other by a draft stress action to resist relative movement between said frames.

2. In a device of the class described the combination with a car underframe, of a car body frame movably mounted thereon, and friction plate mechanisms mounted at each end and intermediate the ends of the car, acting to centralize said car body frame on said underframe, all of said riggings acting simultaneously to resist movement between said car body frame and said underframe.

3. In a device of the class described the combination with a car underframe, of a car body movably supported thereon, and resilient shock absorption mechanisms connected between the car body and said underframe at each end of the car and each of said mechanisms acting to resist the movement of the car body on the car frame, the one by a buffing stress action and the other by a draft stress action.

4. In a car of the class described the combination with the underframe thereof, of a car body movably mounted thereon, shock absorption mechanisms connected on said car body at each end of the car, and means on the car underframe coacting therewith to stress said mechanisms, the one by a draft stress action and the other by a buffing stress action at the respective ends of the car to resist movement of the car body on the frame.

5. In a car of the class described a car underframe, a car body frame movable thereon, a plurality of friction shock absorption gears connected at each end of the car acting to resist movement of the body frame upon the underframe, means connecting the gears with the car body whereby the gears at each end of the car coact at all times, and a plurality of intermediate means disposed between the ends of the car acting to assist in resisting movement between said respective frames.

6. In a car of the class described the combination with the car underframe, of an end sill member rigidly secured thereon, a car body movably mounted upon said car frame, end shoes connected thereto and supporting the same upon said underframe, a plurality of resilient friction plates mounted at the ends of the car to co-act with said end shoes, straps secured to the end shoes engaging around the friction plates, and means on the end sill of the underframe coacting with said shoes to stress said plates to resist movement of the car body on the underframe.

7. In a car of the class described the combination with a car underframe having side, intermediate, and center sills, of end sills forming a part of said underframe and rigidly attached to said side, intermediate and center sills, abutment members movable upon said end sills, a car body movably mounted upon said underframe, end shoe members rigidly secured to the ends of the car body, resilient mechanisms disposed to receive the movable abutment members of said underframe end sills and end shoe members thereagainst to stress said mechanisms and resist movement of the car body on said underframe, and mechanism causing each of the resilient mechanisms to act as a draft stress mechanism when the car body moves in one direction.

8. In a car of the class described the combination with the car underframe, of end sills secured thereto, said end sills having abutment members movable thereon, a car body movably mounted upon said frame, shock absorption gears associated with the car body adapted to be engaged by said abutment members of the end sills acting to resist movement of the car body upon said underframe, mechanism secured to the car body causing the shock absorption gears at the end of the car acting together to resist movement of the car body relatively of the underframe and a plurality of independent intermediate shock absorption gears mounted between the ends of the car body and assisting in resisting movement of the car body on said car underframe.

9. In a device of the class described the combination with the longitudinal sills of a car underframe, of end sills rigidly secured thereto, abutment members movable on said end sills, a car body movably mounted upon said frame, shock absorption gears mounted at the ends of said car body connected therewith to coact and adapted to be engaged by the abutments whereby both act at the same time to resist movement of the car body upon the frame, channel members secured to said car body and engaging the center sills of the underframe, and means secured to said car body and extending around and beneath the center sills of the car underframe to maintain the car body slidably associated with the car frame.

10. In a device of the class described the combination with the longitudinal sills of a car underframe, of end sills rigidly secured thereto, abutment members movable on said end sills, a car body movably mounted upon said frame, shock absorption gears mounted at the ends of said car body adapted to be engaged by the abutments to resist movement of the car body upon said underframe, means causing said shock absorption gears simultaneously acting to resist movement of said car body, channel members secured to said car body and slidably engaging the center sills of the car frame, means secured to said car body and extending around and beneath the center sills of the underframe to maintain the car body associated therewith, and intermediate shock absorption gears mounted on said underframe and acting also to resist movement of the car body thereon.

11. In a device of the class described a car underframe embracing a plurality of longitudinal sill members, end sill members rigidly attached thereto, a car body movably mounted upon said underframe, friction shock absorption riggings associated with the car body adapted to coact with the end sills of the underframe to each resist movement of the car body thereon in either direction, a plurality of independent similar intermediate riggings mounted upon said underframe between the longitudinal sills thereof, and means associated with the car body to coact with said intermediate shock absorption riggings to oppose movement of the car body in either direction.

12. In a device of the class described a car underframe embracing a plurality of longitudinal sill members, end sill members rigidly attached thereto, a car body movably mounted upon said underframe, shock absorption riggings associated with the car body adapted to coact with the end sills of the car underframe to each resist movement of the car body on the underframe in either direction, a plurality of intermediate riggings mounted upon the underframe between the longitudinal sills thereof, means associated with the car body to coact with said intermediate draft riggings to oppose movement of the car body in either direction, and means associated with the car body and extending around said underframe to maintain the car body slidably associated therewith.

13. In a device of the class described a car underframe, an end sill member forming a part thereof, a plurality of compartments in said end sill member, shock absorption friction plates mounted therein, and a car body movably mounted upon said underframe, coacting with and guided by said end sill members whereby said shock absorption friction plates act to each resist movement of the car body on said car underframe in either direction.

14. In a device of the class described the combination with the longitudinal sills of a car, of an end sill rigidly connected thereto having a plurality of compartments therein, shock absorbing friction means mounted within said compartments, a car body movably mounted upon said longitudinal sills, and means rigidly secured to the car body and coacting with said end sill members whereby each shock absorbing friction means therein acts to resist movement of said car body in either direction on said car frame.

15. In a device of the class described the combination with a car underframe and car body mounted movably thereon, of buffing and draft absorption gears connected at the ends of the car between said car body and underframe acting to yieldingly resist movement of the car body on the frame in either direction.

In testimony whereof I have hereunto subscribed my name in the presence of two subscribing witnesses.

JAMES MILTON WAUGH.

Witnesses:
   CHARLES W. HILLS, Jr.,
   FRANK K. HUDSON.